US009658490B2

(12) United States Patent
Kao et al.

(10) Patent No.: US 9,658,490 B2
(45) Date of Patent: May 23, 2017

(54) TOUCH DISPLAY DEVICE

(71) Applicant: TPK Universal Solutions Limited, Hong Kong (CN)

(72) Inventors: Kuo-Feng Kao, Xinbei (TW); Sung-Chien Huang, Taoyuan (TW); Cheng-Yuan Lu, Taoyuan (TW); Hung-Yu Tsai, Yilan (TW)

(73) Assignee: TPK Universal Solutions Limited, Hong Kong (CN)

( * ) Notice: Subject to any disclaimer, the term of this patent is extended or adjusted under 35 U.S.C. 154(b) by 6 days.

(21) Appl. No.: 14/727,886

(22) Filed: Jun. 2, 2015

(65) Prior Publication Data

US 2015/0355490 A1 Dec. 10, 2015

(30) Foreign Application Priority Data

Jun. 4, 2014 (CN) .......................... 2014 1 0244249

(51) Int. Cl.
*G02F 1/1335* (2006.01)
*G02F 1/13363* (2006.01)
*G02F 1/1333* (2006.01)
*G02F 1/1343* (2006.01)

(52) U.S. Cl.
CPC ...... *G02F 1/13363* (2013.01); *G02F 1/13338* (2013.01); *G02F 1/13439* (2013.01); *G02F 1/133305* (2013.01); *G02F 1/133502* (2013.01); *G02F 1/133528* (2013.01); *G02F 2001/133531* (2013.01); *G02F 2001/133541* (2013.01); *G02F 2001/133635* (2013.01); *G02F 2001/133638* (2013.01)

(58) Field of Classification Search
CPC ......... G02F 2001/133635; G02F 2001/133638
See application file for complete search history.

(56) References Cited

U.S. PATENT DOCUMENTS

| 5,619,356 A * | 4/1997 | Kozo | G02F 1/133553 349/102 |
| 2010/0296027 A1* | 11/2010 | Matsuhira | G02F 1/133308 349/96 |
| 2013/0293096 A1* | 11/2013 | Kang | H01H 1/10 313/511 |

* cited by examiner

*Primary Examiner* — Phu Vu
(74) *Attorney, Agent, or Firm* — Paul Bendemire

(57) ABSTRACT

A touch display device includes an upper polarizer, a display unit and a touch sensing unit. The upper polarizer allows light having a first linear polarization direction to pass therethrough and blocks light having a second linear polarization direction. The second linear polarization direction is perpendicular to the first linear polarization direction. The display unit is spaced-apart from the upper polarizer and is used to display images. The touch sensing unit is disposed between the upper polarizer and the display unit, and includes an optical compensation substrate and a touch sensing electrode structure disposed on the optical compensation substrate. The optical compensation substrate is flexible and is able to control the polarization property of the light passing therethrough.

14 Claims, 13 Drawing Sheets

FIG.1

| | | |
|---|---|---|
| | Cover plate | ~2 |
| 411 | Upper polarizer | ~3 |
| | Touch sensing electrode structure | ~42(421) |
| | Optical compensation substrate | ~41 |
| 412 | Display unit | ~5 |
| | Lower polarizer | ~6 |

(layer 4 = 42 + 41)

FIG.2

| | | |
|---|---|---|
| | Cover plate | ~2 |
| | Upper polarizer | ~3 |
| 411 | First electrode layer | ~421(42) |
| | Optical compensation substrate | ~41 |
| 412 | Second electrode layer | ~422(42) |
| | Display unit | ~5 |
| | Lower polarizer | ~6 |

1

| Cover plate | ～2 |
| Upper polarizer | ～3 |
| Quarter-wave plate | ～7 |
| Touch sensing electrode structure | ～42 (421) |
| Optical compensation substrate | ～41 |
| Display unit | ～5 |
| Lower polarizer | ～6 |

411 — (pointing to Touch sensing electrode structure)
412 — (pointing to Display unit)
4 = {42, 41}

FIG.5

TOUCH DISPLAY DEVICE

BACKGROUND OF THE INVENTION

This application claims priority to Chinese Application Serial Number 201410244249.7, filed on Jun. 4, 2014, which is herein incorporated by reference.

Field of The Invention

The disclosure relates to touch display devices, and more particularly to touch display devices with faded etching marks and optical compensation.

Related Art of Invention

Touch display devices typically include a cover glass, a touch sensing unit, an upper polarizer, a liquid crystal unit, a lower polarizer, a backlight unit, etc. The aforesaid elements are stacked in sequence from top to bottom. A touch sensing electrode in the touch sensing unit is made from a transparent conductive material (such as a nano silver) that is subjected to a patterning process. However, since the optical properties of a touch sensing electrode and an electrode substrate are different, in some situations, users will observe the shape of the touch sensing electrode (i.e., an etching mark), thereby adversely affecting the quality of a displayed image.

The electrode substrate of the aforesaid touch sensing unit can be made of a transparent hard material (such as glass), or can be made of a transparent soft material (such as polyethylene terephthalate (PET)). For an electrode substrate made of polyethylene terephthalate (PET), the optical properties of the light generally remain unchanged prior to and after passing therethrough. However, uneven surfaces and unexpected structural stress in parts of the electrode substrate will cause the optical properties (e.g., polarization) of the light passing through these parts of the electrode substrate to change, thereby affecting the overall optical properties of the touch display device.

SUMMARY OF THE INVENTION

Therefore, an object of the disclosure is to provide a touch display device that can alleviate at least one of the drawbacks of the prior arts.

According to the disclosure, the touch display device includes an upper polarizer, a display unit and a touch sensing unit. A first linear polarization direction and a second linear polarization direction that are perpendicular to each other are defined. The upper polarizer allows light that has the first linear polarization direction to pass therethrough and blocks light that has the second linear polarization direction. The display unit is spaced apart from the upper polarizer and is used to display an image. The touch sensing unit is disposed between the upper polarizer and the display unit, and includes an optical compensation substrate and a touch sensing electrode structure. The optical compensation substrate is flexible and is able to control polarization property of light passing therethrough. The touch sensing electrode structure is disposed on the optical compensation substrate.

BRIEF DESCRIPTION OF THE DRAWINGS

Other features and advantages of the disclosure will become apparent in the following detailed description of the embodiments with reference to the accompanying drawings, of which:

FIG. 1 is a schematic view, illustrating the first embodiment of a touch display device according to this disclosure;

FIG. 2 shows another embodiment of the touch display device;

FIG. 5 is a schematic view, illustrating the third embodiment of a touch display device according to this disclosure;

DETAILED DESCRIPTION OF THE INVENTION

First Touch Display Device

Figure 3:
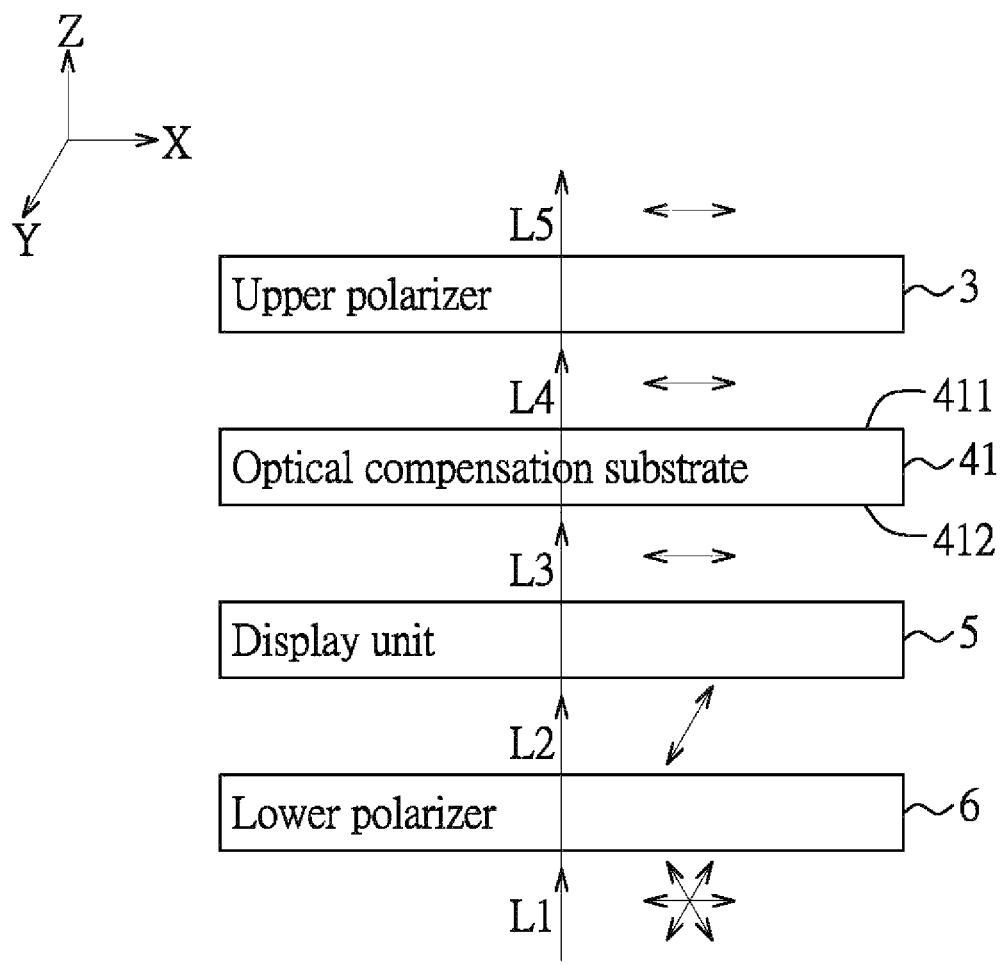
FIG. 3 is a schematic view, illustrating a light path of the touch display device of the first embodiment.

FIGS. 1, 2 and 3 show a touch display device according to at least one embodiment. In order to conveniently describe the optical properties of light, a first linear polarization direction and a second linear polarization direction which is perpendicular to the first linear polarization direction are defined. For instance, in FIG. 3, the first linear polarization direction is a direction along an X-axis, and is illustrated by a horizontal arrow. The second linear polarization direction is a direction along a Y-axis and is illustrated by an inclined arrow. The traveling direction of light rays (L1 to L5) is along a Z-axis. Moreover, according to the state of use of the touch display device 1, in the following description associated with any element, the term "above" or the like represents a side that is closer to the user in space, while the term "under" or the like represents a side that is more distant from the user in space.

To be specific, the touch display device 1 according to this disclosure includes a cover plate 2, an upper polarizer 3, a touch sensing unit 4, a display unit 5, a lower polarizer 6 and a backlight unit (not shown).

The cover plate 2 is a topmost structure of the touch display device 1, and can be made of a transparent material such as glass, but is not limited thereto. In one or more embodiments, the cover plate 2 and the touch sensing unit 4 are respectively disposed at two opposite sides of the upper polarizer 3. However, in a variation of this embodiment, the cover plate 2 is disposed between the upper polarizer 3 and the touch sensing unit 4. Nevertheless, the position of the cover plate 2 is not limited thereto.

The upper polarizer 3 allows light that has the first linear polarization direction to pass therethrough and blocks light that has the second linear polarization direction. In one or more embodiments, the upper polarizer 3 is disposed under the cover plate 2. However, the position of the upper polarizer 3 is not limited thereto. In a variation of some embodiments, the upper polarizer 3 is disposed above the cover plate 2.

The touch sensing unit 4 includes an optical compensation substrate 41 and a touch sensing electrode structure 42, is disposed between the upper polarizer 3 and the display unit 5, and is used for providing a touch sensing function.

The optical compensation substrate 41 is made of a flexible material and is able to control the polarization property of the light passing therethrough. In one or more embodiments, the main material of the optical compensation substrate 41 is cyclo olefin polymer (abbreviated as COP). The optical compensation substrate 41 has a light-output surface 411 and a light-input surface 412 that are disposed at opposite sides of the optical compensation substrate 41. The light-input surface 412 is distal from the upper polarizer 3. Incident light having the first linear polarization direction or the second linear polarization direction is incident upon the light-input surface 412. The light-output surface 411 is proximate to the upper polarizer 3. Transmitted light exits from the light-output surface 411. In one or more embodiments, a polarization direction of the incident light entering the light-input surface 412 is the same as a polarization direction of the transmitted light exiting from the light-output surface 411. That is to say, when the incident light passes through the optical compensation substrate 41 to form the transmitted light, the optical compensation substrate 41 controls the polarization property of the incident light and the transmitted light to be uniform so as to match the polarization property of the upper polarizer 3.

The touch sensing electrode structure 42 is disposed on the optical compensation substrate 41, is mainly made of a material selected from the group consisting of silver nanowire, metal mesh, indium tin oxide (abbreviated as ITO), carbon graphene, carbon nanotube (abbreviated as CNT), conductive polymers and combination thereof, so as to form a single layer electrode pattern or a bridge structure electrode pattern with a rhombic, triangular, rectangular, or other shape, and is used for generating a touch sensing signal. The touch sensing electrode structure 42 is a single layer structure which only has a first electrode layer 421 (as shown in FIG. 1). The first electrode layer 421 is disposed at the light-output surface 411 of the optical compensation substrate 41 (see FIG. 1). Alternatively, the first electrode layer 421 may also be disposed on the light-output surface 412 of the optical compensation substrate 41 (not shown). Moreover, the touch sensing electrode structure 42 may also be a double layer structure which has a first electrode layer 421 and a second electrode layer 422 (as shown in FIG. 2), where the first electrode layer 421 is disposed at the light-output surface 411 of the optical compensation substrate 41, and the second electrode layer 422 is disposed at the light-input surface 412 of the optical compensation substrate 41.

The display unit 5 is spaced apart from the upper polarizer 3, is disposed under the touch sensing unit 4, and is used to display an image. To be specific, since the touch display device 1 in one or more embodiments is illustrated using a liquid crystal display (abbreviated as LCD hereinafter) as an example, the display unit 5 in fact includes a color filter layer, a liquid crystal layer, a transistor layer, an alignment layer, etc. (not shown in any of the drawings), and the display unit 5 is used to control the optical properties of the imaging light.

The lower polarizer 6 is disposed under the display unit 5, and allows light having the second linear polarization direction to pass therethrough, and blocks light having the first linear polarization direction.

A light path of the touch display device 1 in one or more embodiments is illustrated in the following (see FIG. 3). In one or more embodiments, the upper polarizer 3 only allows light having the first linear polarization direction to pass through. The optical compensation substrate 41 controls the polarization direction of the light after passing therethrough to have the same polarization direction as the light entering thereinto. The display unit 5 is configured such that when not powered (i.e., without an electrical current passing therethrough) controls the polarization direction of the light passing therethrough to make a 90-degree rotation in terms of its polarization direction. The lower polarizer 6 is disposed to only allow light having the second linear polarization direction to pass therethrough.

Therefore, referring to FIG. 3, light (L1) having a plurality of polarization directions is emitted from the backlight unit (not shown), and enters and is filtered by the lower polarizer 6 to form light (L2) having the second linear polarization direction. After the light (L2) passes through the display unit 5 which is not powered, the light (L2) transforms into light (L3) having the first linear polarization direction. After the light (L3) (i.e., the aforesaid incident light) passes through the optical compensation substrate 41, the light (L3) becomes light (L4) (i.e., the aforesaid transmitted light). Under the control of the optical compensation substrate 41, the lights (L3 and L4) have the same, uniform first linear polarization direction. Subsequently, the light (L4) is able to pass through the upper polarizer 3 to form light (L5) which is then viewed by the user.

On the other hand, if the display unit 5 is powered, the polarization property of the light passing through the display unit 5 will not be changed. Therefore, the light (L3) maintains the second linear polarization direction. The transmitted light (L4) which passes through the optical compensation substrate 41 is controlled to have the second linear polarization direction. As such, the light (L4) is then blocked by the upper polarizer 3. At this moment, the user can only see a black image.

Therefore, under the abovementioned configurations, since the light passing through the optical compensation substrate 41 and the touch sensing electrode structure 42 will subsequently enter the upper polarizer 3, the upper polarizer 3 (which has the property of reducing transmittance, and the property of filtering light in terms of polarization) can effectively prevent the users from viewing the etching marks of the touch sensing electrode structure 42 from a side of the cover plate 2 (i.e., the position above the cover plate 2), thereby enhancing the image viewing quality. Moreover, since the optical compensation substrate 41 of some embodiments can effectively control the light passing therethrough to maintain its original polarization property, the transmitted light (L4) can either pass through the upper polarizer 3 or be blocked by the upper polarizer 3 in a predictable and controllable manner. Compared to a conventional electrode substrate which unpredictably changes the light polarization property, in one or more embodiments, through the presence of the optical compensation substrate 41, the light passing therethrough and entering the upper polarizer 3 is prevented from having a non-uniform light property. As a result, the optical visual effect of the touch sensing device 1 according to this disclosure can be enhanced.

It should be noted that, the aforesaid operational states of the display unit 5 (being powered or not powered) are just two extreme states that are illustrated to show that the light completely passes through the upper polarizer 3 (i.e., the brightest state of the image) or the light is completely blocked by the upper polarizer 3 (i.e., the black state of the image). However, it can be understood that, when different electric currents flow through the display unit 5, the twisted angles of the liquid crystals result in multiple light polarization directions. As a result, eventually, some of the light can pass through the upper polarizer 3, thereby rendering various brightness levels between the brightest state and the black state. Under these operational states, the polarization direction of the light can still be controlled by the optical compensation substrate 41 such that the incident light (L3) and the transmitted light (L4) have the same polarization direction, thereby achieving the same optical effect as previously described.

In the following description of some embodiments of this disclosure, in order to simplify the content of the description, the description will only include the two extreme states (i.e., the light completely passing through the upper polarizer 3 and the light being completely blocked by the upper polarizer 3) for illustration. The states in which portions of the light pass through the upper polarizer 3 are similar to those described in the first touch display device and will be omitted for the sake the brevity.

Second Touch Display Device

Figure 4:
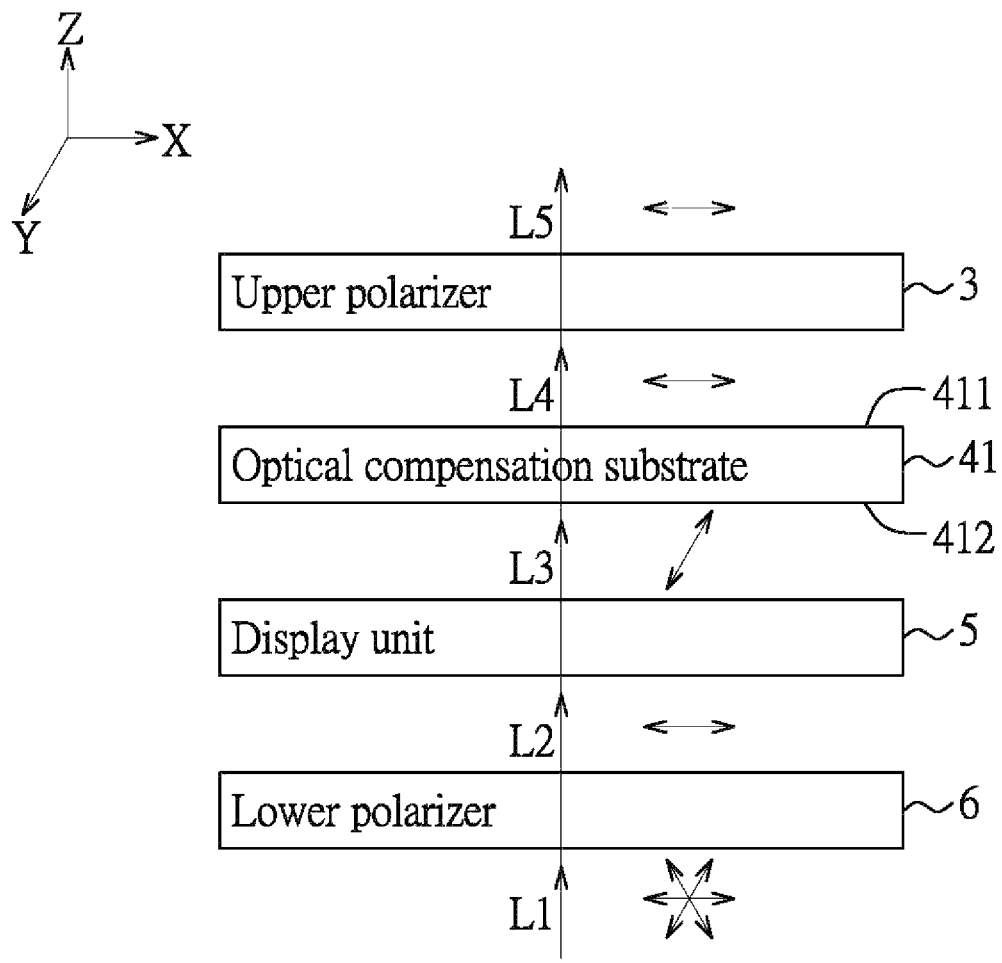
FIG. 4 is a schematic view, illustrating a light path of the second embodiment of a touch display device according to this disclosure.

Referring to FIGS. 1 and 4, the touch display device 1 has a structure similar to that described above. The main differences reside in the optical compensation substrate 41 and the lower polarizer 6.

To be specific, the optical compensation substrate 41 in one or more embodiments is a half-wave plate made of cellulose triacetate (abbreviated as TAC) or N-type cellulose triacetate (abbreviated as N-TAC). The optical compensation substrate 41 has a fast axis (not shown) that forms an angle of 45 degrees with the first linear polarization direction, such that a 90-degree rotation in terms of the linear polarization direction of the incident light (L3) occurs. A linear polarization direction of the linearly polarized incident light (L3) entering the light-input surface 412 of the optical compensation substrate 41 is perpendicular to a linear polarization direction of the linearly polarized transmitted light (L4) exiting the light-output surface 411 of the optical compensation substrate 41. Moreover, different from the first touch display device, the lower polarizer 6 in one or more embodiments only allows light having the first linear polarization direction to pass therethrough, and blocks light having the second linear polarization direction.

That is to say, in one or more embodiments, the upper polarizer 3 only allows light with the first linear polarization direction to pass therethrough. The optical compensation substrate 41 controls the polarization direction of the light passing therethrough to have a 90-degree rotation in terms of its polarization direction. The display unit 5 is configured such that when not powered, controls the polarization direction to rotate by 90 degrees. The lower polarizer 6 only allows light having the first linear polarization direction to pass therethrough.

Therefore, light (L1) having a plurality of polarization directions that enters the lower polarizer 6 forms light (L2) having a first linear polarization direction. After the light (L2) passes through the display unit 5 which is not powered, the light (L2) becomes light (L3) having the second linear polarization direction. Under the control of the optical compensation substrate 41, the light (L3) (i.e., the aforesaid incident light) passing through the optical compensation substrate 41 becomes light (L4) (i.e., the aforesaid transmitted light) with the first linear polarization direction, which is a polarization direction that is rotated by 90 degrees from that of the light (L3). Subsequently, the light (L4) having the first linear polarization direction is able to pass through the upper polarizer 3 to form light (L5) which is then viewed by the user.

On the other hand, if the display unit 5 is powered, the polarization property of the light passing through the display unit 5 will not be changed. Therefore, the incident light (L3) would have the first linear polarization direction. The transmitted light (L4) which penetrates through the optical compensation substrate 41 is controlled to have the second linear polarization direction, and is then blocked by the upper polarizer 3. At this moment, the user will only see a black image.

In one or more embodiments, since the touch sensing unit 4 is, same as that of the first touch display device, disposed between the upper polarizer 3 and the display unit 5, the user is effectively prevented from viewing the etching marks of the touch sensing electrode structure 42. Moreover, through the optical compensation substrate 41 of some embodiments controlling the polarization direction of the light passing therethrough to rotate by 90 degrees, the transmitted light (L4) can be uniformly transformed to have a predictable and controllable polarization direction. Moreover, the upper polarizer 3 cooperates with the lower polarizer 6 to enhance the optical visual effect of the touch display device 1.

Third Touch Display Device

Figure 6:
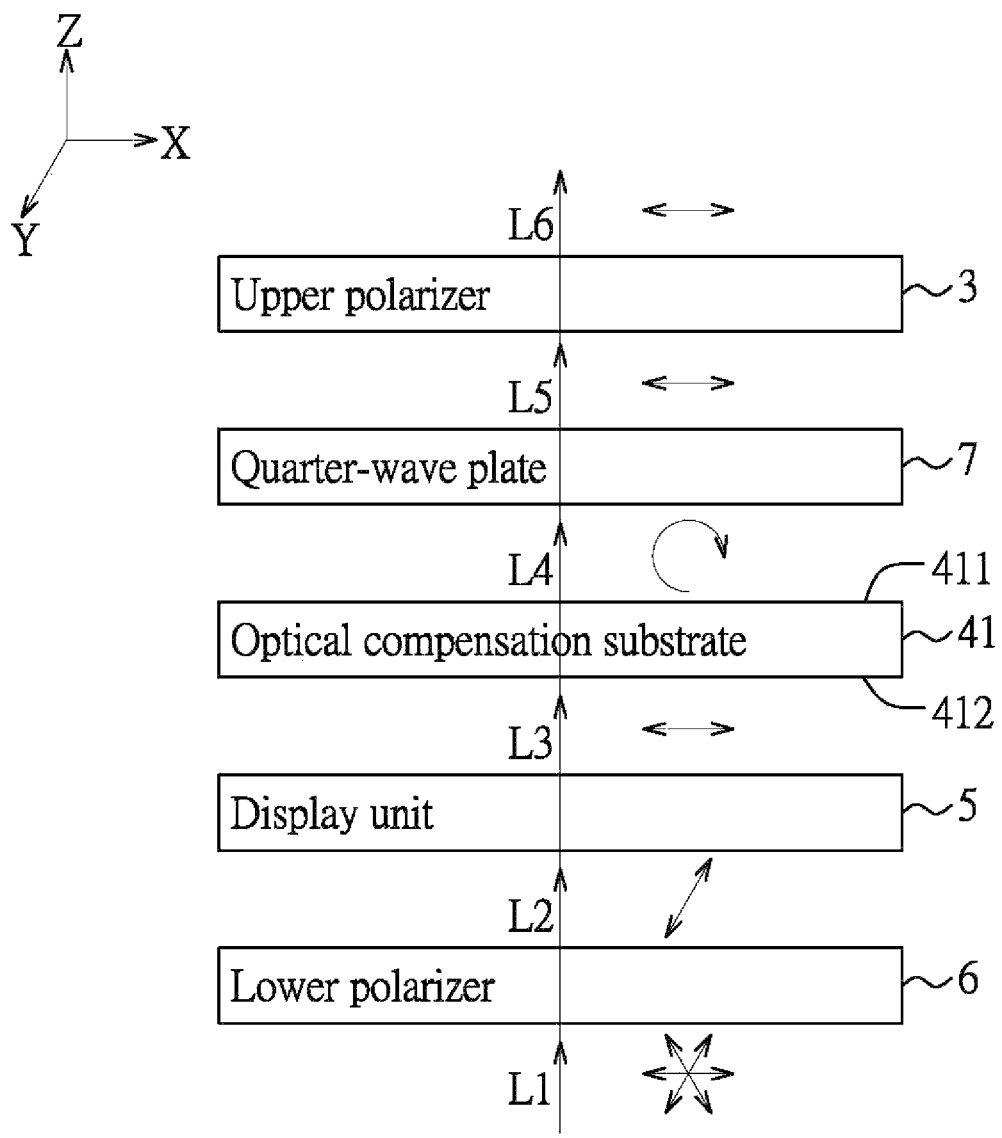
FIG. 6 is a schematic view, illustrating a light path of the touch display device of the third embodiment.

FIGS. 5 and 6 show a touch display device 1 according to at least one embodiment. In one or more embodiments, the touch display device 1 has a structure similar to that described above. The main differences reside in that the touch display device 1 of some embodiments further includes a quarter-wave plate 7, and in that the optical compensation substrate 41 in one or more embodiments is different from the above.

To be specific, the quarter-wave plate 7 in one or more embodiments is disposed between the upper polarizer 3 and the optical compensation substrate 41, and includes a fast axis (not shown) that forms an angle of 45 degrees with the first linear polarization direction to allow the polarization of the light passing through to switch between being linearly polarized and circularly polarized.

Moreover, the optical compensation substrate 41 in one or more embodiments is a quarter-wave plate made of M-type cellulose triacetate (abbreviated as M-TAC), x-plate material, etc. The quarter-wave plate includes a fast axis. The fast axis and the first linear polarization direction form an angle of 45 degrees therebetween. The optical compensation substrate 41 transforms the linearly polarized incident light (L3) having a first linear polarization direction or a second linear polarization direction into circularly polarized light transmitted light (L4) having a left-handed or right-handed circular polarization direction to exit from the optical compensation substrate 41 (shown as a circular arrow in FIG. 6), thereby switching the light between linearly polarized and circularly polarized.

Therefore, in one or more embodiments, the upper polarizer 3 only allows light with the first linear polarization direction to pass therethrough. The quarter-wave plate 7 controls light to switch between linearly polarized and circularly polarized. The optical compensation substrate 41 controls light to switch between linearly polarized and circularly polarized. The display unit 5 is configured to when not powered, control the polarization direction of the light passing therethrough to rotate by 90 degrees. The lower polarizer 6 only allows the light having the second linear polarization direction to pass therethrough.

Therefore, light (L1) having a plurality of polarization directions entering the lower polarizer 6 will form light (L2) having the second linear polarization direction. After the light (L2) passes through the display unit 5 which is not powered, the light (L2) becomes light (L3) which has the first linear polarization direction. After the light (L3) (i.e., the aforesaid incident light) passes through the optical compensation substrate 41, the light (L3) transforms into circularly polarized light (L4) (i.e., the aforesaid transmitted light). After passing through the optical compensation substrate 41 (which has the fast axis having a direction the same as that of the quarter-wave plate 7), the light (L4) becomes light (L5) returned to having the first linear polarization direction. The light (L5) eventually passes through the upper polarizer 3 and is observed by the user.

On the other hand, if the display unit 5 is powered, the polarization property of the light passing through the display unit 5 will not be changed. Therefore, the incident light (L3) becomes light having the second linear polarization direction. The transmitted light (L4) which exits the optical compensation substrate 41 is controlled to be circularly polarized, but with a rotation of the circular polarization direction (i.e., left-handed or right-handed) opposite to that exiting the display unit 5 which is not powered. Therefore, after the quarter-wave plate 7 restores the light into linearly polarized, light (L5) having the second linear polarization direction is formed, and is then blocked by the upper polarizer 3.

Therefore, in one or more embodiments, since the touch sensing unit 4 is, same as that of the first touch display device, disposed between the upper polarizer 3 and the display unit 5, the user is effectively prevented from viewing the etching marks of the touch sensing electrode structure 42 from a side of the cover plate 2. Moreover, through the optical compensation substrate 41 of some embodiments controlling the light passing therethrough to change from being linearly polarized to circularly polarized, the transmitted light (L4) can be uniformly transformed to have a predictable and controllable polarization direction. Moreover, the upper polarizer 3 and the lower polarizer 6 cooperate with the quarter-wave plate 7 to enhance the optical visual effect of the touch display device 1.

Fourth Touch Display Device

Figure 7:
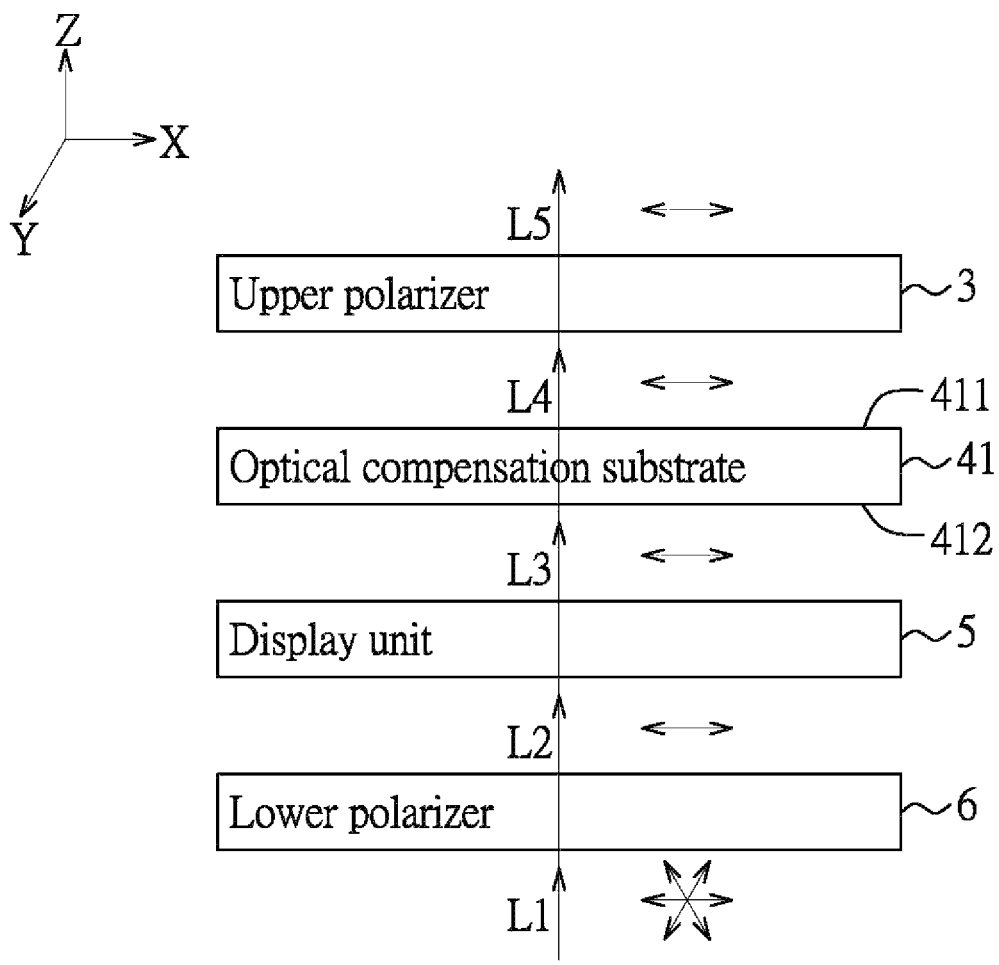
FIG. 7 is a schematic view, illustrating a light path of the fourth embodiment of a touch display device according to this disclosure.

FIGS. 1 and 7 show a touch display device 1 according to this disclosure. In one or more embodiments, the touch display device 1 has a structure similar to that described above. The main differences reside in the display unit 5 and the lower polarizer 6.

To be specific, in one or more embodiments, when the display unit 5 is not powered, the display unit 5 controls the light passing therethrough to maintain its original polarization direction. The lower polarizer 6 only allows the light having the first linear polarization direction to pass therethrough. On the other hand, the upper polarizer 3 and the optical compensation substrate 41 is similar to those of the first touch display device with the former only allowing the light having the first linear polarization direction to pass therethrough, and the latter controlling the light passing therethrough to maintain its original polarization property.

Therefore, when the display unit 5 is not powered, light (L3) (i.e., the aforesaid incident light) entering the optical compensation substrate 41 has the first linear polarization direction, and light (L4) (i.e., the aforesaid transmitted light) exiting the optical compensation substrate 41 also has the first linear polarization direction under the control of the optical compensation substrate 41, thereby eventually being able to pass through the upper polarizer 3. In addition, when the display unit 5 is powered, both the incident light (L3) and the transmitted light (L4) have the second linear polarization direction, and cannot pass through the upper polarizer 3.

That is to say, compared to the first touch display device, even though the properties of the display unit 5 and the lower polarizer 6 are changed in one or more embodiments, the same results can be achieved through the cooperation of the upper polarizer 3, the optical compensation substrate 41, the display unit 5 and the lower polarizer 6.

Fifth Touch Display Device

Figure 8:
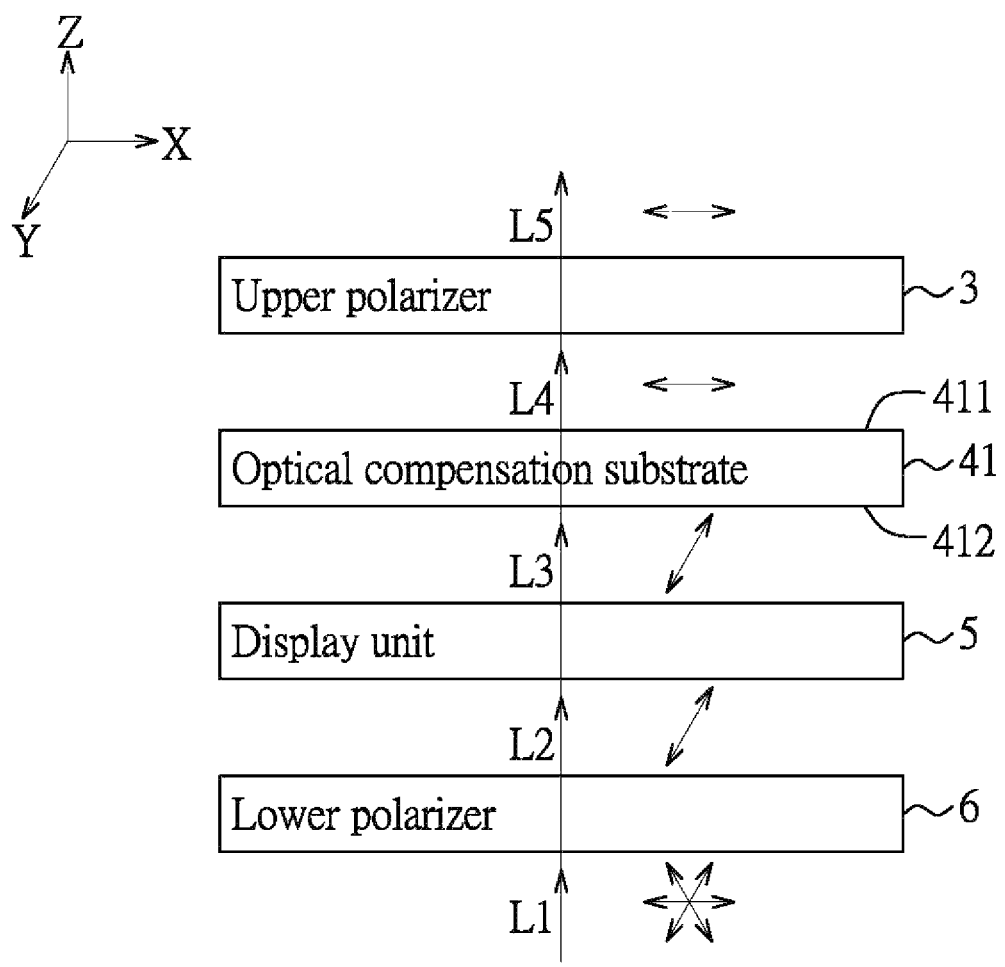
FIG. 8 is a schematic view, illustrating a light path of the fifth embodiment of a touch display device according to this disclosure.

FIGS. 1 and 8 show a touch display device 1 according to this disclosure. In one or more embodiments, the touch display device 1 has a structure similar to that described above. The main differences reside in the display unit 5 and the lower polarizer 6.

To be specific, in one or more embodiments, the display unit 5 controls the light passing therethrough to maintain its original polarization property when not powered. The lower polarizer 6 only allows the light having the second linear polarization direction to pass therethrough. The upper polarizer 3 and the optical compensation substrate 41 have structures similar to those of the second touch display device with the former only allowing the light having the first linear polarization direction to pass therethrough and the latter controlling the polarization direction of the light passing therethrough to rotate by 90 degrees.

Therefore, when the display unit 5 is not powered, light (L3) (i.e., the aforesaid incident light) entering the optical compensation substrate 41 has the second linear polarization direction, and light (L4) (i.e., the aforesaid transmitted light) exiting the optical compensation substrate 41 is transformed to having the first linear polarization direction under the control of the optical compensation substrate 41, and eventually passes through the upper polarizer 3. When the display unit 5 is powered, the incident light (L3) has the first linear polarization direction, and the optical compensation substrate 41 controls and transforms the light into the transmitted light (L4) that has the second linear polarization direction. The light (L4) is then blocked by the upper polarizer 3.

Therefore, compared to the second touch display device, even though the properties of the display unit 5 and the lower polarizer 6 are changed in one or more embodiments, the same results can be achieved through the cooperation among the upper polarizer 3, the optical compensation substrate 41, the display unit 5 and the lower polarization 6.

Sixth Touch Display Device

Figure 9:
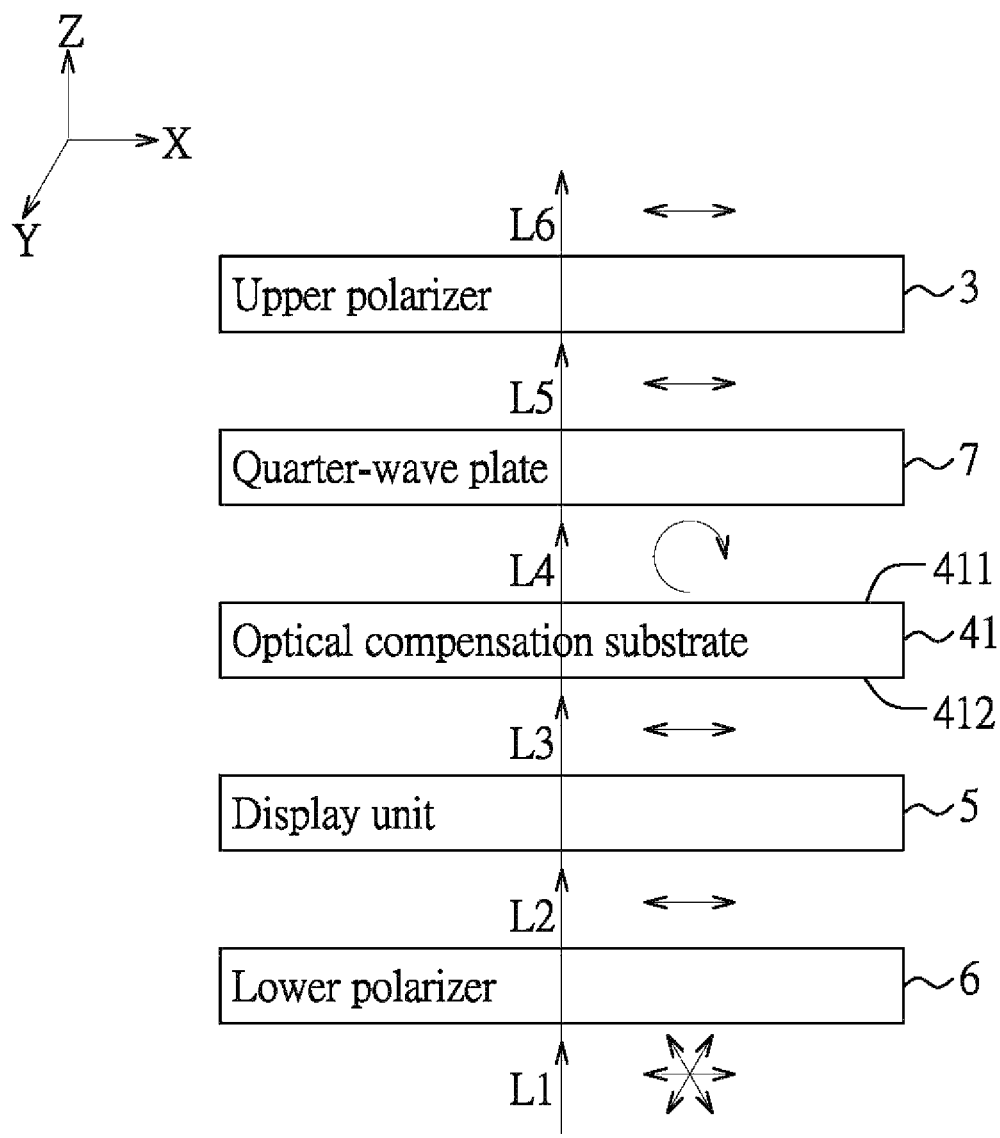
FIG. 9 is a schematic view, illustrating a light path of the sixth embodiment of a touch display device according to this disclosure.

FIGS. 5 and 9 show a touch display device 1 according to this disclosure. In one or more embodiments, the touch display device 1 has a structure similar to that described above. The main differences reside in the display unit 5 and the lower polarizer 6.

In one or more embodiments, the display unit 5, when not powered, controls the light passing therethrough to maintain its original polarization direction. The lower polarization 6 only allows the light having the first linear polarization direction to pass therethrough. The upper polarizer 3, the quarter-wave plate 7, and the optical compensation substrate 41 are similar to those of the third touch display device, i.e., the upper polarizer 3 only allows the light having the first linear polarization direction to pass therethrough, the quarter-wave plate 7 and the optical compensation substrate 41 both control the light passing therethrough to switch between being linearly polarized and circularly polarized.

Therefore, when the display unit 5 is not powered, light (L3) (i.e., the aforesaid incident light) entering the optical compensation substrate 41 has the first linear polarization direction, and light (L4) (i.e., the aforesaid transmitted light) exiting the optical compensation substrate 41 is transformed to being circularly polarized under the control of the optical compensation substrate 41, and eventually passes through the upper polarizer 3 to form light (L6) that is observed by the user. On the other hand, if the display unit 5 is powered, the incident light (L3) has the second linear polarization direction. The transmitted light (L4) is controlled and transformed by the optical compensation substrate 41 to being circularly polarized. However, the rotation direction of the circular polarization (i.e., left-handed or right-handed) of the light (L4) is opposite to that of the light (L4) when the display unit 5 is not powered. After being restored by the quarter-wave plate 7, linearly polarized light (L5) having the second linear polarization direction is formed, which is then blocked by the upper polarizer 3.

Therefore, compared to the third touch display device, even though the properties of the display unit 5 and the lower polarizer 6 are changed in one or more embodiments, the same results can be achieved through the cooperation of the upper polarizer 3, the optical compensation substrate 41, the display unit 5 and the lower polarization 6.

Seventh Touch Display Device

Figure 10:
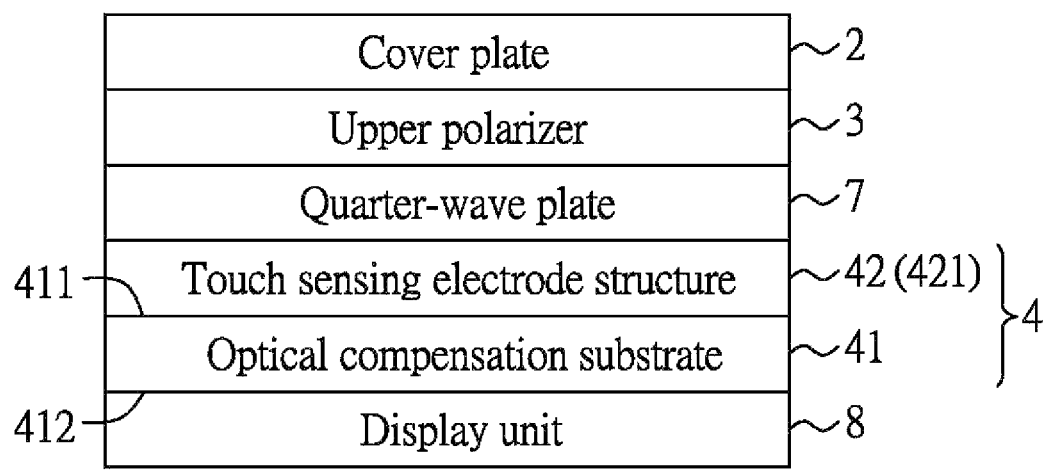
FIG. 10 is a schematic view, illustrating the seventh embodiment of a touch display device according to this disclosure.
Figure 11:
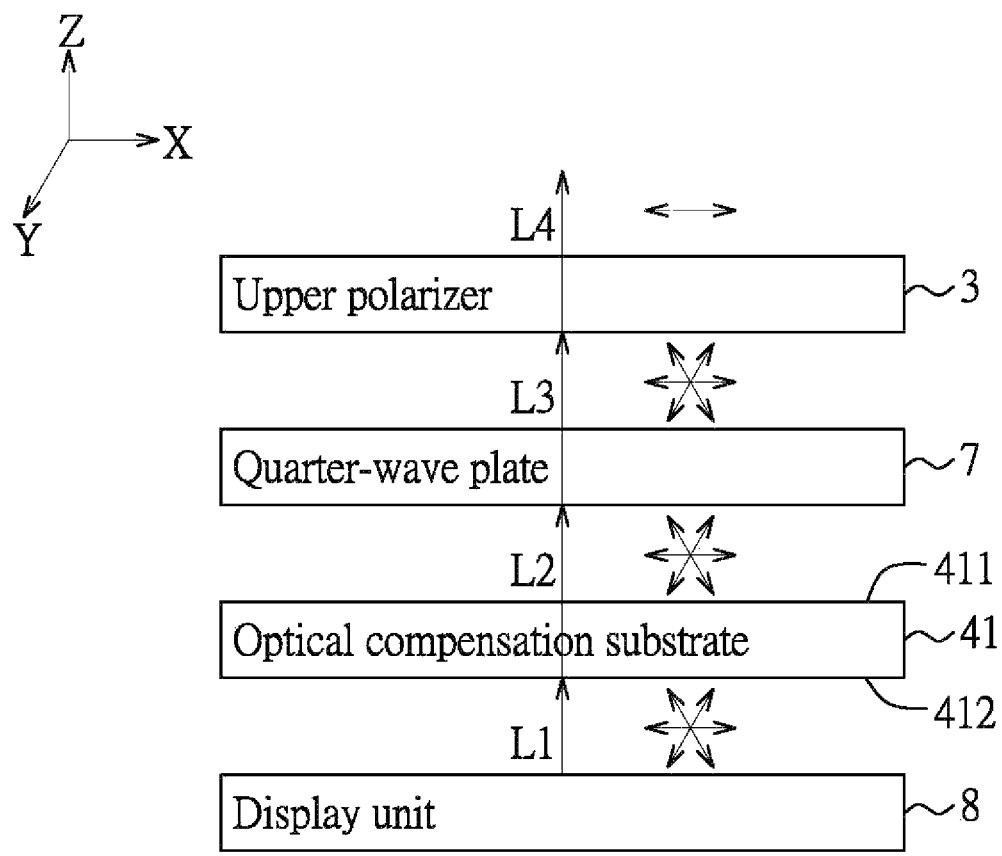
FIG. 11 is a schematic view, illustrating the optical property of light exiting the touch display device of the seventh embodiment.

FIGS. 10 and 11 show a touch display device 1 according to this disclosure. The aforementioned embodiments use a liquid crystal display (LCD) device as the touch display device 1 to illustrate the embodiments. Starting from the seventh touch display device, the touch display device 1 is illustrated using an organic light emitting diode display (abbreviated as OLED) in some embodiments of the present disclosure.

To be specific, the touch display device 1 according to some embodiments includes a cover plate 2, an upper polarizer 3, a quarter-wave plate 7, a touch sensing unit 4 and a display unit 8 that are sequentially stacked.

The cover plate 2 is a topmost structure of the touch display device 1, and can be made of a transparent material such as glass, but is not limited thereto. Moreover, some embodiments is similar to the first touch display device. The cover plate 2 and the touch sensing unit 4 are respectively disposed at two opposite sides of the upper polarizer 3 (as shown in FIG. 10). However, in a variation of some embodiments, the cover plate 2 also be disposed between the upper polarizer 3 and the touch sensing unit 4. However, the position of the cover plate 2 is not limited thereto.

The upper polarizer 3 is similar to that of the first touch display device in allowing light that has the first linear polarization direction to pass therethrough and blocking light that has the second linear polarization direction.

The quarter-wave plate 7 is disposed between the upper polarizer 3 and touch sensing unit 4, and includes a fast axis (not shown) that forms an angle of 45 degrees with the first linear polarization direction so as to switch light between being linearly polarized and circularly polarized.

The touch sensing unit 4 includes an optical compensation substrate 41 and a touch sensing electrode structure 42. The optical compensation substrate 41 is similar to those of the first touch display device and the fourth touch display device, is mainly made of cyclo olefin polymer (COP), and is able to control the incident light entering the light-input surface 412 and the transmitted light exiting the light-output surface 411 to have the same polarization direction. The touch sensing electrode structure 42 is a single layer including a first electrode layer 421 as shown herein. Alternatively, the touch sensing electrode structure 42 is a double layer structure similar to that described in the first touch display device.

The display unit 8 includes OLEDs to create colored imaging lights, and is serves as the source of the imaging light for the touch display device 1 to display images.

Referring to FIG. 11, in one or more embodiments, light (L1) having a plurality of polarization directions is emitted from the display unit 8, and then enters the optical compensation substrate 41 to be the transmitted light (L2) that also has a plurality of polarization directions. After the light (L2) passes through the quarter-wave plate 7, the light (L3) thus formed still has a plurality of polarization directions. After the light (L3) passes through and is filtered by the upper polarization 3, light (L4) having the first linear polarization direction is formed, and is then viewed by the user. If a grayscale image or a black image is desired to be shown on the touch display device 1, the display unit 8 can directly control the brightness of the light emitted from the OLEDs. There is no need to control the liquid crystal orientation like the previous six touch display device.

Figure 12:
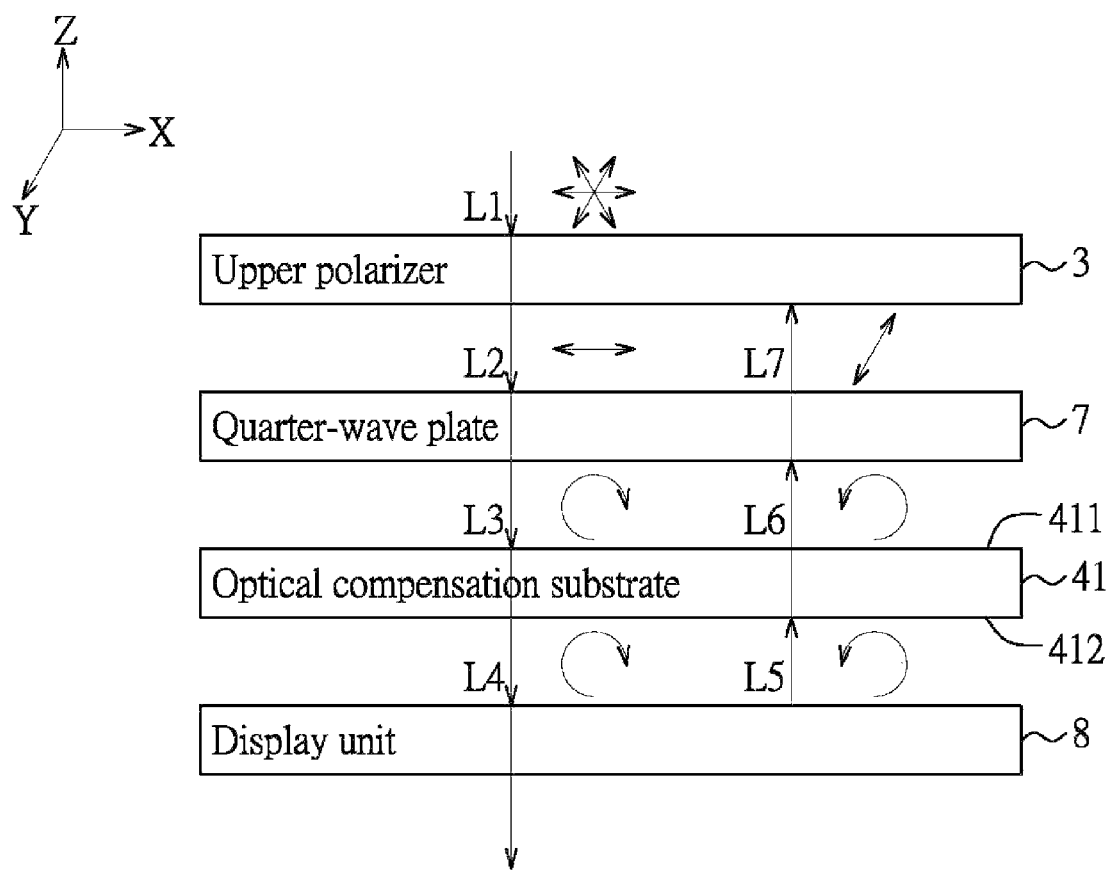
FIG. 12 is a schematic view, illustrating an anti-glare property of the touch display device of the seventh embodiment.

Referring to FIGS. 10 and 12, generally, since the display unit 8 usually contains a metallic electrode structure (not shown), when ambient light (L1) is incident upon the display unit 8 from the side of the cover plate 2, reflected light (L5) is easily formed due to the electrode structure of the display unit 8, thereby adversely affecting the image qualities viewed by the user. However, in one or more embodiments, the glaring issue can be reduced through the cooperation of the upper polarizer 3, the quarter-wave plate 7, and the optical compensation substrate 41.

To be specific, the ambient light (L1) from the environment will become light (L2) having the first linear polarization direction after passing through the upper polarizer 3. After the light (L2) passes through the quarter-wave plate 7, light (L3) thus formed is circularly polarized (e.g., in a right-handed direction (a clockwise direction) as shown herein). The circularly polarized light (L3) will not change its polarization property after passing through the optical compensation substrate 41, but becomes uniform, right-handed circularly polarized light (L4) under the control of the optical compensation substrate 41. When the circularly polarized light (L4) is illuminated on and then reflected by the metal electrode of the display unit 8, the polarization direction of the light (L4) will have a 180-degree phase change to form left-handed (an anti-clockwise direction) circularly polarized reflected light (L5). The reflected light (L5) will not change its polarization property after passing through the optical compensation substrate 41 to form uniform, left-handed circularly polarized light (L6) under the control of the optical compensation substrate 41. After the circularly polarized light (L6) passes through the quarter-wave plate 7, light (L7) having the second linear polarization direction is formed. The light (L7) having the second linear polarization direction cannot pass through the upper polarizer 3, and is therefore blocked by the upper polarizer 3, thereby reducing the glaring phenomenon of the ambient light (L1) formed by the light reflected by the display unit 8. It should be noted that, the aforesaid left-handed and right-handed circular polarization directions are simply used to illustrate the corresponding relationships. The optical properties of the touch display device 1 are not limited thereto.

To sum up, the touch display device 1 of some embodiments is similar to those of the first to sixth touch display device in that the touch sensing unit 4 is disposed between the upper polarizer 3 and the display unit 5. Therefore, according to the optical properties of the upper polarizer 3, the user is prevented from viewing the etching marks of the touch sensing electrode structure 42 from a side of the cover plate 2. Moreover, since the optical compensation substrate 41 of some embodiments is able to control the light passing therethrough to maintain its original polarization property, the imaging light created by the display unit 8 can effectively exit the cover plate 2 in a predictable and controllable manner, and reflected light formed by the ambient light reflected upon the display unit 8 is controlled to be blocked by the upper polarization 3, thereby maintaining the optical performance of the touch display device 1 and preventing the glaring phenomenon.

Eighth Touch Display Device

Figure 13:
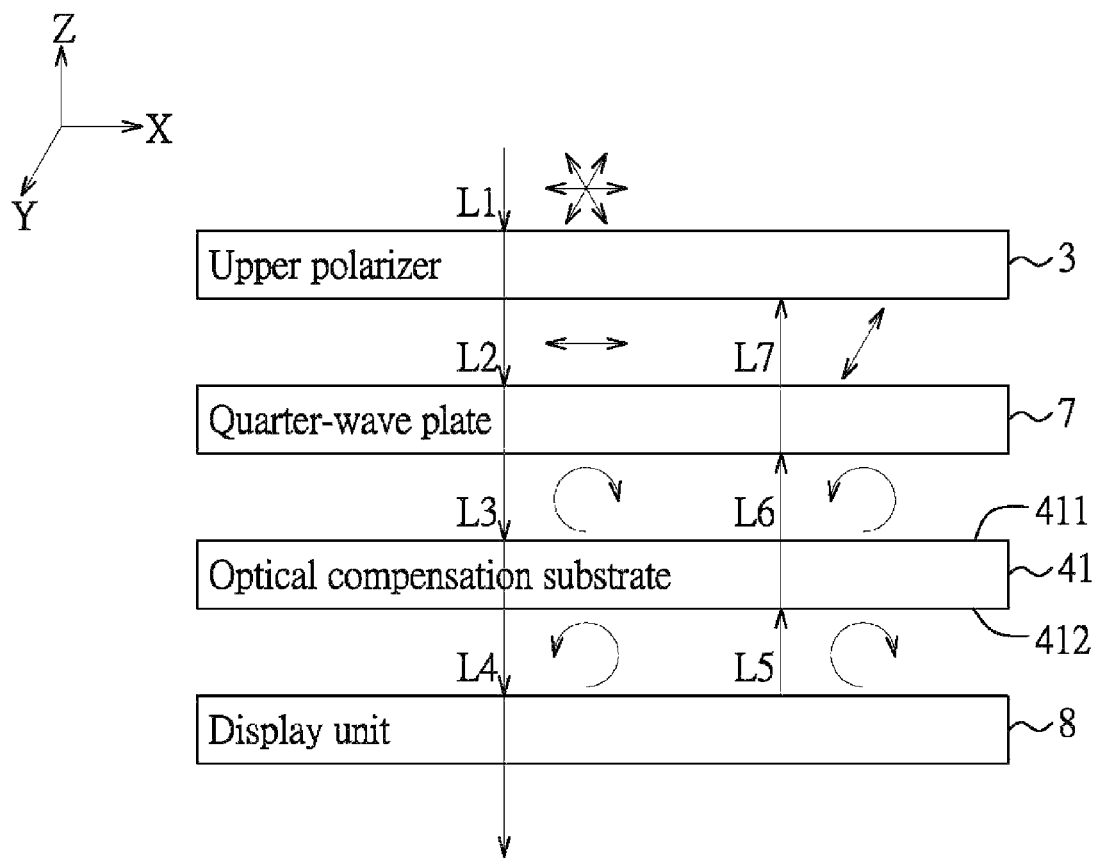
FIG. 13 is a schematic view, illustrating an anti-glare property of the eighth embodiment of a touch display device according to this disclosure.

Referring to FIGS. 10, 11 and 13 show the touch display device 1 according to this disclosure has a structure similar to that described above. The main difference resides in the optical compensation substrate 41.

To be specific, the optical compensation substrate 41 in one or more embodiments is a half-wave plate (similar to that of the second touch display device or the fifth touch display device) that is mainly made of materials such as cellulose triacetate (TAC) or an N-type cellulose triacetate (abbreviated as N-TAC). The optical compensation substrate 41 has a fast axis that forms an angle of 45 degrees with the first linear polarization direction so that linearly polarized light passing therethrough will have a linear polarization direction perpendicular to its original polarization direction prior to entering the optical compensation substrate 41, and that circularly polarized light passing therethrough will have a circular polarization direction opposite to its original circular polarization direction prior to entering the optical compensation substrate 41.

In other words, in one or more embodiments, the upper polarizer 3 only allows the light having the first linear polarization direction to pass therethrough. The quarter-wave plate 7 changes the light between being linearly polarized and circularly polarized. The optical compensation substrate 41 rotates the polarization direction of linearly polarized light by 90 degrees, or rotates the polarization direction of circularly polarized light by 180 degrees.

Referring to FIG. 11, in one or more embodiments, after light (L1) having a plurality of polarization directions as emitted from the display unit 8 sequentially passes through the optical compensation substrate 41 and the quarter-wave plate 7, lights (L2 and L3) having a plurality of polarization directions are formed. Light (L4) having the first linear polarization direction is formed exiting the upper polarizer 3, and is then observed by the user.

Referring to FIG. 13, regarding anti-glare, the ambient light (L1) after passing through the upper polarizer 3 forms light (L2) having the first linear polarization direction. The light (L2) is transformed by the quarter-wave plate 7 to form right-handed circularly polarized light (L3). After the circularly polarized light (L3) passes through the optical compensation substrate 41, uniform, left-handed circularly polarized light (L4) is formed. When the light (L4) is incident upon the metal electrode of the display unit 8 and is reflected thereby, right-handed circularly polarized light (L5) is formed. The circularly polarized light (L5) is then controlled by the optical compensation substrate 41 to form left-handed circularly polarized light (L6). After the circularly polarized light (L6) passes through the quarter-wave plate 7, linearly polarized light (L7) having the second linear polarization direction is formed, and is then blocked by the upper polarizer 3.

Therefore, in one or more embodiments, the touch sensing unit 4 is disposed between the upper polarizer 3 and the display unit 8, thereby effectively controlling the etching marks viewing problem of the touch sensing unit 4. Moreover, since the optical compensation substrate 41 is configured as the half-wave plate and is able to control the optical property of the light passing therethrough, the image light created by the display unit 8 can effectively exit the upper polarization 3 in a controllable manner, thereby providing a good viewing quality for the user, while at the same time solving the glaring problem formed by the reflected ambient light.

Ninth Touch Display Device

Figure 14:
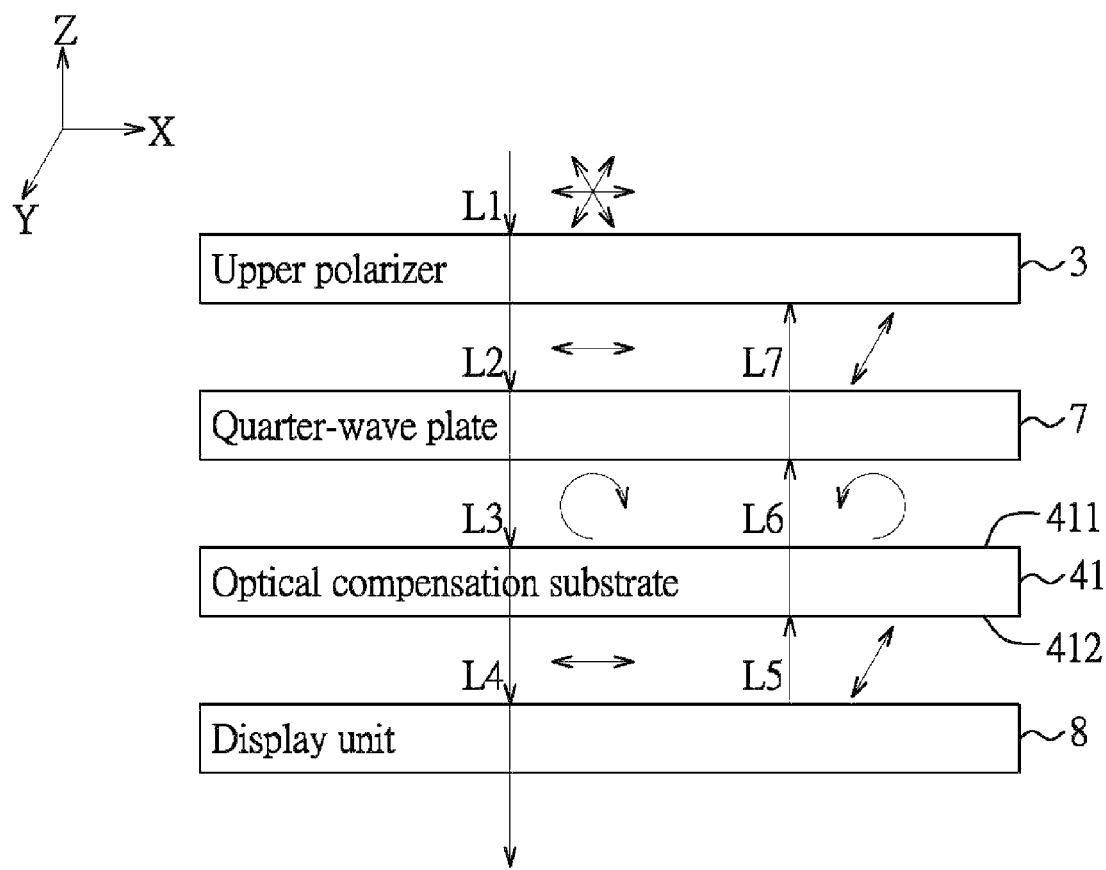
FIG. 14 is a schematic view, illustrating an anti-glare property of the ninth embodiment of a touch display device according to this disclosure.

Referring to FIGS. 10, 11 and 14 show the touch display device 1 according to this disclosure has a structure similar to that described above. The main difference resides in the optical compensation substrate 41.

To be specific, the optical compensation substrate 41 in one or more embodiments is a quarter-wave plate (similar to that of the third touch display device or the sixth touch display device) that is mainly made of materials such as M-type cellulose triacetate (abbreviated as M-TAC) and x-plate. The optical compensation substrate 41 has a fast axis that forms an angle of 45 degrees with the first linear polarization direction so as to change light between being linearly polarized and circularly polarized.

Accordingly, in one or more embodiments, the upper polarizer 3 only allows the light having the first linear polarization direction to pass therethrough. The quarter-wave plate 7 and the optical compensation substrate 41 have fast axes that in the same direction to control the light to switch between being linearly polarized and circularly polarized.

Referring to FIG. 11, under these configurations, after light (L1) having a plurality of polarization directions as emitted from the display unit 8 sequentially passes through the optical compensation substrate 41 and the quarter-wave plate 7, lights (L2 and L3) having a plurality of polarization directions are formed. Light (L4) having a first linear polarization direction is formed after the light (L3) passes through the upper polarizer 3, and is then observed by the user.

Referring to FIG. 14, regarding anti-glare, the ambient light (L1) after passing through the upper polarizer 3 forms light (L2) having the first linear polarization direction. The light (L2) is transformed by the quarter-wave plate 7 to form right-handed circularly polarized light (L3). After passing through the optical compensation substrate 41, the circularly polarized light (L3) is controlled by the optical compensation substrate 41 to form transmitted light (L4) having the first linear polarization direction. When the transmitted light (L4) is incident upon the metal electrode of the display unit 8 and is reflected thereby, the polarization direction will change, and light (L5) having the second linear polarization direction is formed. After being controlled by the optical compensation substrate 41, the linearly polarized light (L5) turns into uniform, left-handed circularly polarized light (L6). After passing through the quarter-wave plate 7, the circularly polarized light (L6) is transformed into light (L7) having the second linear polarization direction, and is then blocked by the upper polarizer 3.

Therefore, in one or more embodiments, the touch sensing unit 4 is disposed between the upper polarizer 3 and the display unit 8, thereby preventing the user from viewing the etching marks of the touch sensing electrode structure 4 from a side of the cover plate 2. Moreover, since the optical compensation substrate 41 is configured as the quarter-wave plate in one or more embodiments, the imaging light created by the display unit 8 can effectively exit the upper polarizer 3 in a controllable manner, thereby preventing unnecessary optical interferences and providing a good viewing quality for the users, and at the same time preventing the glaring problem formed by the ambient light reflected by the display unit 8.

To summarize the aforementioned nine touch display device, the first to sixth touch display device are embodied using a liquid crystal display (LCD) device as a touch display device 1, and the seventh to ninth touch display device are embodied using an OLED device. Regardless of the implementation, through disposing the touch sensing unit 4 between the upper polarizer 3 and the display unit 5, and by utilizing the properties of the upper polarizer 3 with respect to polarization and light filtering, the touch display device 1 of this disclosure can effectively prevent the user from viewing the etching marks of the touch sensing electrode structure 42 from a side of the cover plate 2, thereby enhancing the image viewing quality. Furthermore, through the control on the light polarization property of the optical compensation substrate 41, the touch display device 1 of this disclosure can allow the optical compensation substrate 41 to cooperate with the upper polarizer 3. Moreover, with the cooperation among the display unit 5, the lower polarizer 6 and the quarter-wave plate 7, the optical visual effect of the touch display device 1 can be improved, and the glaring problem when using an OLED display can be solved. Therefore, the purpose of the present disclosure is achieved.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A touch display device comprising:
    an upper polarizer allowing light that has a first linear polarization direction to pass therethrough and blocking light that has a second linear polarization direction perpendicular to the first linear polarization direction;
    a display unit spaced apart from said upper polarizer and used to display an image; and
    a touch sensing unit disposed between said upper polarizer and said display unit, and comprising:
        an optical compensation substrate that is flexible and is configured to control polarization of light passing therethrough, and
        a touch sensing electrode structure that is disposed on said optical compensation substrate;
    wherein the optical compensation substrate is a half-wave plate which has a light-input surface and a light-output surface that are disposed at opposite sides of said half-wave plate, and allows linearly polarized incident light entering said light-input surface and linearly polarized transmitted light exiting said light-output surface to have mutually perpendicular polarization directions.

2. The touch display device as claimed in claim 1, further comprising a quarter-wave plate, said quarter-wave plate being disposed between said upper polarizer and said optical compensation substrate and having a fast axis that forms a 45-degree angle with the first linear polarization direction;
    wherein said optical compensation substrate is a half-wave plate having a light-input surface and a light-output surface that are disposed at opposite sides of said half-wave plate, and allows circularly polarized incident light entering said light-input surface and circularly polarized transmitted light exiting said light-output surface to have mutually opposite circular polarization directions.

3. The touch display device as claimed in claim 1, wherein said optical compensation substrate is mainly made of cellulose triacetate or N-type cellulose triacetate.

4. The touch display device as claimed in claim 1, wherein said optical compensation substrate has a light-input surface and a light-output surface that are disposed at opposite sides of said optical compensation substrate, said touch sensing electrode structure being disposed at one of said light-input surface and said light-output surface.

5. The touch display device as claimed in claim 1, wherein said optical compensation substrate has a light-input surface and a light-output surface that are disposed at opposite sides of said optical compensation substrate, said touch sensing electrode structure having a first electrode layer and a second electrode layer, said first electrode layer being disposed at said light-input surface of said optical compensation substrate, said second electrode layer being disposed at said light-output surface of said optical compensation substrate.

6. The touch display device as claimed in claim 1 wherein said touch sensing electrode structure is mainly made of a material selected from the group consisting of silver nanowire, metal mesh, indium tin oxide (ITO), carbon graphene, carbon nanotube, conductive polymers, and combinations thereof.

7. The touch display device as claimed in claim 1, further comprising a cover plate, said cover plate and said touch sensing unit being disposed at two opposite sides of said upper polarizer.

8. The touch display device as claimed in claim 2, wherein said optical compensation substrate is mainly made of cellulose triacetate or N-type cellulose triacetate.

9. A touch display device comprising:
    an upper polarizer allowing light that has a first linear polarization direction to pass therethrough and blocking light that has a second linear polarization direction perpendicular to the first linear polarization direction;
    a display unit spaced apart from said upper polarizer and used to display an image; and
    a touch sensing unit disposed between said upper polarizer and said display unit, and comprising:
        an optical compensation substrate that is flexible and is configured to control polarization of light passing therethrough; and
        a touch sensing electrode structure that is disposed on said optical compensation substrate; and
    a quarter-wave plate, said quarter-wave plate being disposed between said upper polarizer and said optical compensation substrate and having a fast axis that forms a 45-degree angle with the first linear polarization direction, and allows light passing therethrough to switch between being linearly polarized and circularly polarized; and
    said optical compensation substrate being configured as a quarter-wave plate and having a fast axis that forms a 45-degree angle with the first linear polarization direction, and allowing light passing therethrough to switch between being linearly polarized and circularly polarized.

10. The touch display device as claimed in claim 9, wherein said optical compensation substrate is mainly made of M-type cellulose triacetate.

11. The touch display device as claimed in claim 9, wherein said optical compensation substrate has a light-input surface and a light-output surface that are disposed at opposite sides of said optical compensation substrate, said touch sensing electrode structure being disposed at one of said light-input surface and said light-output surface.

12. The touch display device as claimed in claim 9, wherein said optical compensation substrate has a light-input surface and a light-output surface that are disposed at opposite sides of said optical compensation substrate, said touch sensing electrode structure having a first electrode layer and a second electrode layer, said first electrode layer being disposed at said light-input surface of said optical compensation substrate, said second electrode layer being disposed at said light-output surface of said optical compensation substrate.

13. The touch display device as claimed in claim 9, wherein said touch sensing electrode structure is mainly made of a material selected from the group consisting of silver nanowire, metal mesh, indium tin oxide (ITO), carbon graphene, carbon nanotube, conductive polymers, and combinations thereof.

14. The touch display device as claimed in claim 9, further comprising a cover plate, said cover plate and said touch sensing unit being disposed at two opposite sides of said upper polarizer.

\* \* \* \* \*